250-203.R 56

Sept. 26, 1961

P. H. TAYLOR 3,001,437 350/321

DIFFUSION SCANNER

Filed Aug. 31, 1953

INVENTOR:
Philip H. Taylor
By Herbert E. Metcalf
His Patent Attorney

United States Patent Office 3,001,437
Patented Sept. 26, 1961

3,001,437
DIFFUSION SCANNER

Philip H. Taylor, Santa Ana, Calif., assignor to Northrop Corporation, Hawthorne, Calif., a corporation of California Filed Aug. 31, 1953, Ser. No. 377,448
5 Claims. (Cl. 88—1)

This invention relates to scanning devices and more particularly to a novel scanning disc which may be used with star tracking apparatus to facilitate star tracking operations.

Various types of discs have been proposed and are at present extensively used in connection with star tracking apparatus for scanning purposes. Such a disc, together with suitable apparatus, provides useful information which may be used to establish a relationship between the tracking apparatus and a selected star as a part of essential information required to perform celestial navigation. The above information may also be used in any other manner where an instantaneous or continual reference to one of the heavenly bodies is required. The simplest type of scanner consists of an opaque disc having a transparent section usually of sectorial configuration. Such a disc, together with star tracking apparatus with which it may be used, is shown and described in copending application Serial No. 81,224, filed March 14, 1949. Such a disc as described in the aforementioned application, however, is only useful for scanning a nighttime sky free of sky gradient. If the above disc is used to scan a sky having a gradient, satisfactory results will not be obtained. This is due to the fact that background light of varying intensity or sky gradient may be of such magnitude that the light from a selected star will not impart a useable signal to a photosensitive element constituting a component part of the star tracking apparatus. Accordingly the tracking apparatus is apt to "home" on the background light, sky gradient, or track in some centroidal manner instead of tracking a selected star.

Accordingly it is an object of the present invention to provide a scanning device, usable with suitable star tracking apparatus, to facilitate the tracking of a star or other point source of light located in an area portions of which may vary in light intensity with respect to other portions of the area.

Another object is to provide a scanning device comprising at least two distinct sections having different light passing characteristics.

Another object is to provide a scanning device, usable with suitable star tracking apparatus, which does not allow a photosensitive element comprising a component part of the apparatus to recognize sky gradients.

These and other objects will become more apparent from the following description and drawings in which like reference characters denote like parts throughout the several views. It is to be expressly understood, however, that the drawing is for the purpose of illustration only and not a definition of the limits of the invention, reference being had for this purpose to the appended claims.

Figure 6:
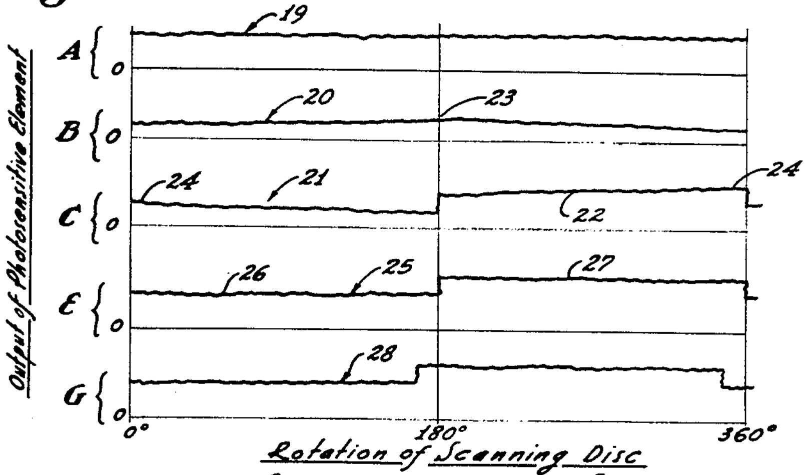

FIGURE 6 graphically illustrates various output signals generated by a photosensitive element under conditions as described herein.

Figures 1, 2, 3:
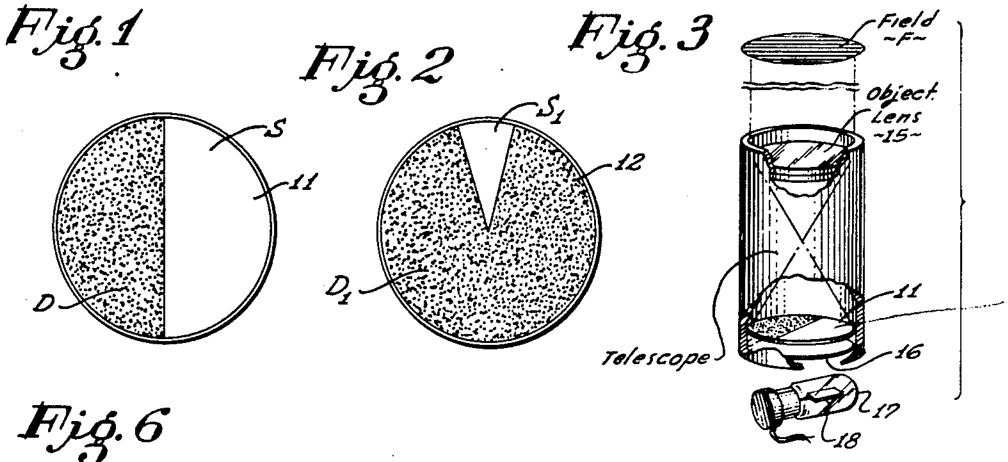
FIGURES 1 and 2 show different physical shapes which the sections of the scanning disc of the instant invention may assume.
FIGURE 3 is a partial schematic view of a telescope in which the scanning disc as disclosed herein is mounted.

Referring to the drawing for an illustrative embodiment of the scanning device of the instant invention, FIGURES 1 and 2 show scanning discs 11 and 12, respectively, which may be utilized with star tracking apparatus as disclosed in the aforementioned application. Each of these discs (11 and 12) comprises two distinct portions; disc 11 comprises two semi-circular portions indicated by D and S, disc 12 comprises a first section $S_1$, which is a sector of the disc, and a second section $D_1$ constituting the remainder of the disc. The portions D and $D_1$ are light diffusing sections, these sections may be constructed of glass or quartz the partial circular surfaces of which are finely ground. Portions S and $S_1$ of discs 11 and 12, respectively, are specular transmitting sections, these sections may also be constructed of quartz the surfaces of which are coated with a neutral density film. This neutral density film being an evaporative film of constant light transmission over that portion of the spectrum to which a photo-electric cell, subjected to light passed by portions S and $S_1$, is sensitive. Such a film may for example be Chromel A film. These diffusing and specular sections may assume various well known shapes, the discs shown in FIGURES 1 and 2 merely illustrate two physical shapes which the sections may assume.

Throughout this specification and the appended claims the term "specular transmitting section" will refer to a section of a scanning disc (as described above) constructed of a partially clear material having a filtering action on light passing therethrough.

Assuming that the discs just described are to be used with star tracking apparatus for scanning a sky varying in light intensity at one point as compared with another point, in this event either of the discs (11 or 12) are rotatably mounted at the focal plane of a telescope 14, in a conventional manner substantially as shown in FIGURE 3. The telescope includes a conventional objective lens 15 and is provided with a collecting lens 16 and phostosensitive element 17, the latter having a cathode 18, located adjacent but on the opposite side of the scanning disc from lens 15. It may also be assumed that the field of view F of the telescope 14 does not at present contain a star of sufficient magnitude to be sensed by element 17, that is to cause element 17 to generate a signal other than that due to skylight. Under the conditions just described, only skylight (referred to throughout this application as non-coherent light) will enter the telescope 14, via objective lens 15, this non-coherent light will be focused over the entire circular area of the scanning disc. If the light in field F varies in intensity at various locations therein, e.g., due to sky gradient, clouds, and etc., light of varying intensity will be focused on the scanning disc in varying intensity. The surfaces of the diffusing sections are ground to such a degree and the surfaces of the specular transmitting sections are so coated that a constant amount of light will pass through the disc to contact cathode 18 regardless of its angular position. In other words, either of the discs 11 or 12 will pass light comparable to a completely clear disc except the amount of light passed will be somewhat less. Accordingly, the total amount of light passed by the scanning disc will cause the photosensitive element 17 to generate a signal of constant magnitude providing no star or point source of light is present in the field F. In the series of curves shown in FIGURE 6 the output of element 17 is graphically illustrated with reference to the angular position of the scanning disc. The signal generated by element 17, under conditions as just described in which no star or point source of light is present, is represented by the horizontal line 19 in FIGURE 6(A). However, if a star $S_2$, of sufficient magnitude to be sensed by element 17, is in the field F its presence will cause element 17 to generate a useful signal at such times as its image is focused on a specular section of the scanning disc. However, light from the star $S_2$, at such times as light from this star is focused on a diffusing section, will cause element 17 to generate a minute signal only. An explanation of the behavior of starlight (referred to in this application as coherent light) as passed by the specular and diffusion sections and why starlight passing through the latter sections will cause element 17 to generate a minute signal only, as compared with a specular section, is disclosed in connection with FIGURES 4 and 5.

Figure 4:
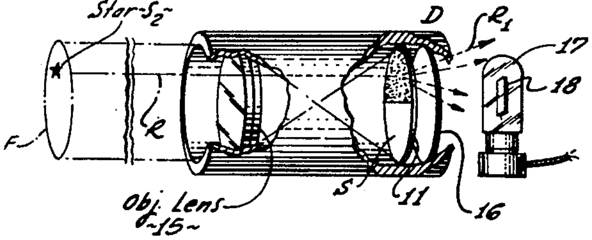

Referring first to FIGURE 4, the action of diffusing sections (D or $D_1$) on light originating at a point source, such as for example the star $S_2$, is schematically illustrated. In this figure rays R from the selected star enter the telescope 14 through its objective lens 15 and are focused on a diffusing section, for purposes of illustration it may be assumed these rays are focused on the section D of disc 11. Here the starlight, together with skylight, is diffused or scattered as indicated at $R_1$ according to the well known cosine law. Accordingly very little or no starlight reaches the photosensitive element 17 and it responds, for practical purposes, as though skylight only was present in the field of view of the telescope. Accordingly the signal generated by the photosensitive element due to light (both starlight and skylight) passing through the diffusing section D during a complete revolution of the disc 11 is represented by the curve 20 of FIGURE 6(B).

Figure 5:
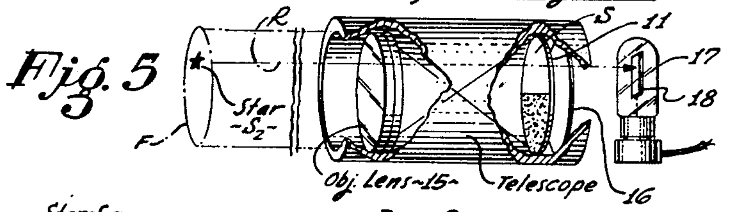
FIGURES 4 and 5 are schematic views showing the behavior of light rays from a selected star, or other point source of light, at such times as they pass through different sections of the scanning disc shown in FIGURE 1.

In FIGURE 5 the action of the specular transmitting sections (S or $S_1$) on starlight is schematically illustrated. Here rays R from the selected star $S_2$ enter the telescope and are focused, for example, on the section S of disc 11. Here nearly all the starlight passes through section S and is passed to the photosensitive element 17 by the collecting lens 16. Accordingly the signal generated by the photosensitive element due to light (both starlight and skylight) passing through the specular section S during a complete revolution of the disc 11 is represented by the curve 21 shown in FIGURE 6(C). This signal will be shifted one hundred and eighty degrees (180°) with respect to the curve 20, one-half of this curve is of greater magnitude as indicated at 22, this is due to starlight passing through the specular section S and contacting element 17.

Variations in the amplitude of the curves 20 and 21, as indicated at 23 and 24, respectively, may be due to sky gradient or other sky background light of varying intensity. However, as these variations in sky intensity are sensed by the photosensitive element throughout a complete revolution of the disc 11, the total amount of light sensed by the element 17 will be constant, except for light due to the star $S_2$ at such times as its light passes through a specular section. This can be graphically shown by combining curves 20 and 21 into a single output signal represented by the curve 25 of FIGURE 6(E). This combined curve constitutes an alternating signal having a certain constant amplitude through one hundred and eighty degrees (180°), as indicated at 26, the remaining portion of the curve also being constant but of somewhat greater amplitude proportional to the light of the star $S_2$, as indicated at 27. The portion 26 of curve 25 represents the output of element 17 at such time as the light from the star $S_2$ is focused on the diffusing section D of disc 11, the portion 27 represents the output of element 17 at such time as light from the star is focused on the specular section S. If the disc 12 is used to scan the sky, instead of disc 11, a similar output signal from element 17 will result. However, if the disc 12 is used portion 27 of curve 25 will be of less duration as the light from the star $S_2$ will be focused on specular section $S_1$ a shorter period of time than on section $D_1$ during one revolution of the disc 12. Should the relationship between the star $S_2$ and telescope 14 change, from that indicated by curve 25, a shifted output signal 28 will be generated by element 17 as shown in FIGURE 6(G). The curve 28 is identical with curve 25 except it will be shifted to the right or left in accordance with the new relationship existing between the star $S_2$ and telescope 14 in a well known manner.

Thus it is seen a signal of higher amplitude, proportional to the brightness of light received from the selected star, will appear in the output of the photosensitive element 17. This signal is not affected by background skylight of varying intensity or sky gradient. How these signals are used for star tracking purposes is well known, their use comprises no part of the present invention and accordingly this feature is not discussed in this disclosure.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

What is claimed is:

1. A scanning device of the class described, comprising: a disc having at least two distinct portions, one of said portions being a light diffusing section and another of said portions being a specular transmitting section, said diffusing section being constructed of quartz having ground surfaces, said specular transmitting section being constructed of a transparent material the surfaces of which are coated with a neutral density film.

2. A scanning device as set forth in claim 1, further characterized by said neutral density film being Chromel A film.

3. A scanning device as set forth in claim 1, wherein said diffusing and specular sections are defined by generally extending radial lines and a peripheral portion of said disc.

4. A scanning device of the class described, comprising: a disc having at least two distinct portions, one of said portions being a light diffusing section and another of said portions being a specular transmitting section, said diffusing section being constructed of glass the surfaces of which are ground, said specular transmitting section being constructed of a transparent material the surfaces of which are coated with a neutral density film.

5. A scanning device of the class described, comprising: a disc having at least two distinct portions, one of said portions being a light diffusing section and another of said portions being a specular transmitting section, said specular transmitting section being constructed of a transparent material the surfaces of which are coated with an evaporative film.

References Cited in the file of this patent

UNITED STATES PATENTS

| | | |
|---|---|---|
| 2,513,367 | Scott | July 4, 1950 |

FOREIGN PATENTS

| | | |
|---|---|---|
| 33,746 | Holland | Oct. 15, 1934 |
| 118,904 | Great Britain | Sept. 19, 1918 |